United States Patent [19]

Lamb

[11] 4,133,794

[45] * Jan. 9, 1979

[54] POLYESTER PLASTICIZERS

[75] Inventor: Frank Lamb, Oldham, England

[73] Assignee: Ciba-Geigy AG, Basel, Switzerland

[*] Notice: The portion of the term of this patent subsequent to Dec. 19, 1995, has been disclaimed.

[21] Appl. No.: 602,340

[22] Filed: Aug. 6, 1975

[30] Foreign Application Priority Data

Aug. 22, 1974 [GB] United Kingdom ............... 3685/74

[51] Int. Cl.$^2$ ..................... C07C 69/34; C08K 5/11; C08K 5/12; C08L 27/06

[52] U.S. Cl. ............................ 260/31.6; 260/404.8; 560/90; 560/185

[58] Field of Search ............ 260/76, 77, 31.6, 475 P, 260/404.8; 560/90

[56] References Cited

U.S. PATENT DOCUMENTS

| 2,914,556 | 11/1959 | Hostettler et al. | 260/475 P |
|---|---|---|---|
| 2,977,385 | 3/1961 | Fowler et al. | 260/475 P |
| 3,033,822 | 5/1962 | Kibler et al. | 260/76 X |
| 3,149,087 | 9/1964 | Anagnostopoulos et al. | 260/31.6 |
| 3,167,524 | 1/1965 | Lauck et al. | 260/31.6 |
| 3,169,945 | 2/1965 | Hostettler et al. | 260/475 P |
| 3,250,738 | 5/1966 | Isaacs et al. | 260/31.6 |
| 3,502,623 | 3/1970 | Hurworth et al. | 260/76 |
| 3,786,011 | 1/1974 | Price et al. | 260/31.6 |
| 3,957,753 | 5/1976 | Hostettler et al. | 260/31.6 |
| 3,972,962 | 8/1976 | Williams et al. | 260/31.6 |

FOREIGN PATENT DOCUMENTS 859642  1/1961  United Kingdom.
1137882 12/1968 United Kingdom.

Primary Examiner—Allan Lieberman
Attorney, Agent, or Firm—Luther A. R. Hall

[57] ABSTRACT

Caprolactone modified polyesters, derived from an aliphatic diol, an aliphatic dicarboxylic acid or mixtures thereof, optionally with a proportion not exceeding 10 mole % of an aromatic dicarboxylic acid and terminated with an alcohol or monocarboxylic acid are good plasticizers for thermoplastic polymers especially polyvinyl chloride.

10 Claims, No Drawings

POLYESTER PLASTICIZERS

The present invention relates to novel plasticisers for thermoplastic polymers such as polyvinyl chloride, and more particularly to plasticisers derived from polyesters incorporating ε-capro-lactone as co-reactant.

In British Patent Specification No. 1,137,882 there is claimed a process for the manufacture of polyesters which comprises reacting a mixture of the following components:
(a) between 10 mole % and 65 mole % of ε-caprolactone,
(b) between 45 mole % and 17.5 mole % of an aliphatic dihydroxy compound, or of a mixture of two or more such compounds, and
(c) between 45 mole % and 17.5 mole % of an aliphatic dicarboxylic acid, or of a mixture of two or more such acids, or of a mixture of one or more such acids with a proportion not exceeding 10 mole % of the total acids used of an aromatic dicarboxylic acid, the proportions of the components (a), (b) and (c) of the reaction mixture being further selected, within the limits defined above, according to the nature of the individual compounds constituting components (b) and (c) in such a way that the overall ratio of carbon to oxygen atoms in the polyester obtained, excluding from consideration the oxygen atoms present in the terminal groups, is at least 4.5:2, provided that when component (b) consists of a single aliphatic α, ω-dihydroxy compound and component (c) consists of a single aliphatic α, ω-dicarboxylic acid, at least one of components (b) and (c) is a compound in which the main chain carbon atoms carry one or more substituent groups which are lower alkyl groups having from 1 to 4 carbon atoms.

There may also be included in the reaction mixture from which the polyester is obtained, in addition to components (a), (b) and (c) already defined, a monohydroxy compound or a monocarboxylic acid and the preferred ratio of monofunctional component to difunctional component is between 5 mole % and 50 mole %. The polyesters thus produced are stated to be useful as plasticisers for vinyl chloride resins.

British Patent Specification No. 859,642 describes polyesters derived from lactones with at least one terminal hydroxyl group as being useful as plasticisers for vinyl halide and other resins. The polymerisation is initiated by such compounds as primary alcohols, diols containing from 2 to 10 carbon atoms and dicarboxylic acids such as phthalic acid, isophthalic acid and terephthalic acid. It is also stated that when the polyesters are to be used as plasticisers, the molecular weight may range between about 1500 and about 9000 and that optimum plasticising characteristics are obtained with polyesters having molecular weights between about 2000 and about 4000.

We have found surprisingly that caprolactone modified polyesters, derived from an aliphatic dihydroxy compound and an aliphatic dicarboxylic acid or mixtures of aliphatic dicarboxylic acids optionally with a proportion not exceeding 10 mole % of an aromatic dicarboxylic acid and terminated with an alcohol or monocarboxylic acid such that the molecular weight ranges from 500 to 1400 and the ratio of monofunctional component to difunctional component is from 55 mole % to 220 mole %, are more efficient, have lower clear points, and give better low temperature properties when used as PVC plasticisers than comparable products described in Brit. Pat. Nos. 1,137,882 and 859,642.

According to the present invention there is provided a polyester having the formula $$M(P)_a(D)_b(L)_cM \qquad I$$

in which M is the residue of one or more aliphatic monocarboxylic acids or one or more saturated straight or branched chain monohydric alcohols containing from 4 to 12 carbon atoms, P is the residue of one or more saturated straight or branched chain aliphatic diols containing from 2 to 4 carbon atoms, D is the residue of one or more aliphatic dicarboxylic acids containing from 4 to 6 carbon atoms, or the residue of one or more such acids with a proportion not exceeding 10 mole % of the total acids used, of one or more aromatic dicarboxylic acids containing from 8 to 16 carbon atoms, L is the residue of 6-hydroxy-caproic acid, each of the residues being joined together by ester linkages, residues P, D and L being distributed at random throughout the molecule, a, b and c each having a value greater than zero, the amount of residue of hydroxy acid being from 10 mole % to 90 mole %, preferably 20 mole % to 70 mole %, most preferably 30 mole % to 50 mole %, based on the total number of moles of reactants, and the molar ratios of the remaining reactants being chosen so that the average molecular weight of the product is from 500 to 1400 and the ratio of monofunctional component to difunctional component, i.e. alcohol to diol or monocarboxylic acid to dicarboxylic acid, is from 55 mole % to 220 mole %. Liquid polyesters are preferred since on the commercial scale they are much easier to handle and process than solid polyesters.

The residue of 6-hydroxy-caproic acid is preferably derived from epsilon caprolactone, but it could be derived from 6-hydroxy-caproic acid itself in the preparation of compounds of formula I.

When M is the residue of a monocarboxylic acid, the acid preferably contains from 8 to 10 carbon atoms. The acid may be, for example, caproic, caprylic, 2-ethylhexanoic, isooctanoic, capric or lauric acid. When M is the residue of a monohydric alcohol, the alcohol preferably contains from 8 to 11 carbon atoms. The alcohol may be for example, n-butanol, isobutyl alcohol, n-hexanol, isooctyl alcohol, nonanol or isodecyl alcohol. Particularly preferred alcohols are isooctyl alcohol (a commercially available mixture containing branched chain primary alcohols with eight carbon atoms), "Alphanol" 79 (which consists mainly of straight- and branched-chain primary alcohols containing 7-9 carbon atoms), 2-ethylhexanol, isodecyl alcohol, Alfol 810 (a commercial product consisting mainly of n-octanol and n-decanol), the mixtures of predominantly straight clain aliphatic alcohols containing 7 to 9 carbon atoms sold under the Trade Mark "Linevol" 79, and the mixture of predominantly straight chain aliphatic alcohols containing 9 to 11 carbon atoms sold under the Trade Mark "Linevol" 911.

The diol corresponding to residue P may be, for example, ethylene glycol; diethylene glycol; propane-1,2-diol; butane-1,3-diol or butane-1,4-diol. The chain may, if desired, be interrupted by an oxygen atom as in diethylene glycol.

The aliphatic dicarboxylic acid or anhydride corresponding to residue D may be for example succinic acid, glutaric acid or adipic acid or the anhydrides. A commercially available mixture containing approximately 27.4% succinic acid, 42.4% glutaric acid and 30.2% adipic acid is particularly useful.

The aromatic dicarboxylic acid or anhydride corresponding to residue D may, if desired, be substituted with from 1 to 4 alkyl groups containing from 1 to 4 carbon atoms.

The dicarboxylic acid or anhydride preferably contains 8 carbon atoms and may be isophthalic acid, but o-phthalic acid or phthalic anhydride is particularly preferred.

The present invention also provides a process for the manufacture of polyesters of formula I which comprises reacting a mixture of the following components (a) from 10 to 90 mole % of epsilon caprolactone or the corresponding hydroxyacid (b) a hydroxylic component which comprises one or more saturated straight or branched chain aliphatic diols containing from 2 to 4 carbon atoms (c) an acidic component which comprises one or more aliphatic dicarboxylic acids containing from 4 to 6 carbon atoms or one or more such acids with a proportion not exceeding 10 mole % of the total acids, of one or more aromatic dicarboxylic acids containing from 8 to 16 carbon atoms and (d) one or more aliphatic monocarboxylic acids containing from 4 to 12 carbon atoms, or one or more saturated straight or branched chain monohydric alcohols containing from 4 to 12 carbon atoms. The hydroxylic components are used in stoichiometric amount or up to 20% excess over the stoichiometric amount related to the acidic components. The amount of lactone and the ratios of the remaining reactants are chosen so that the average molecular weight of the product is from 500 to 1400.

The process for the manufacture of the polyesters of formula I may be carried out by conventional methods for the manufacture of polyesters prepared solely from dihydroxy compounds and dicarboxylic acids. For example, the reaction mixture may conveniently be heated from 100° C. to 250° C. under conditions such that the water resulting from the condensation reaction is removed as it is formed, for example by passing a current of inert gas through the heated reaction mixture or by conducting the reaction in the presence of a suitable inert solvent such as xylene, with which the water may be removed by distillation as an azeotrope. Preferably, the reaction is continued until the proportion of carboxylic acid end groups in the resulting polyester corresponds to an acid value of not more than 10 milligrams and especially not more than 5 milligrams potassium hydroxide per gram.

If desired, a catalyst commonly used in polyester formation may be added to the reaction mixture, for example strong acids such as sulphuric acid, phosphoric acid, p-toluene sulphonic acid, Lewis acids such as stannic acid, zinc chloride, aluminum chloride and metal salts and metal derivatives such as metal alkoxides for example tetrabutyl titanate, zinc adipate, antimony oxide and organo-tin compounds especially dibutyl tin oxide. The amount of catalyst used may be from 0.001% to 5% by weight based on the total weight of the reaction mixture. If desired up to 1% by weight of activated carbon based on the total weight of the reaction mixture may be added either to the reaction mixture or just before the filtration stage to preserve the colour of the product.

The polyesters of the present invention which may be used in amounts up to 60% by weight of the plasticised composition are efficient, easily processed plasticisers with good extraction resistance. They show an improvement in permanence in PVC without loss of efficiency when compared with conventional non-polymeric plasticisers. In fact, the polyesters of the present invention show a remarkable combination of properties not present in conventional non-migratory plasticisers: not only do they possess resistance to extraction and migration but they overcome the major defect of plasticisers of this type since they can be readily processed at temperatures commonly used for monomeric plasticisers.

A further major practical advantage of these novel plasticisers is their much lower viscosities compared with conventional non-migratory polyester plasticisers. This leads to much easier handling, more rapid dispersion of mixtures and easier cleaning of equipment.

The polyesters of the present invention may be incorporated into thermoplastic polymers such as polyvinyl chloride or its copolymers by conventional methods. If desired, other conventional additives may be present in the thermoplastic composition such as heat and light stabilisers, antioxidants, fillers, pigments, lubricants, processing aids and other plasticisers.

Examples of heat and light stabilisers are as follows:
(1) Salts of inorganic or organic acids containing metals such as aluminium, barium, bismuth, calcium, cadmium, potassium, lithium, magnesium, sodium, lead, antimony, tin, strontium or zinc or any metal which is capable of exerting a stabilising effect on PVC in salt form. The salts may be simple or complex.

Examples of inorganic salts are basic lead carbonate and tribasic lead sulphate.

Organic acids which may be used are:
(a) Aliphatic carboxylic acids, straight or branched chain unsaturated or saturated, and optionally containing hydroxyl substituents or oxygen in epoxy groups. Examples are zinc 2-ethyl hexanoate, barium laurate and stannous octanoate.
(b) Aromatic mono- or di-carboxylic acids containing any type of substitution in the aromatic groups and any type of alkyl/aryl configuration.

Examples are cadmium p-tertiary butyl benzoate, calcium benzoate or lead salicylate.
(c) As acidic materials, phenols capable of forming stable compounds (phenates) with metals whether in a suitable solution or not.

An example of such a compound is barium nonyl phenate.
(2) Organo-metallic compounds of any of the following metals, aluminium, barium, bismuth, calcium, cadmium, potassium, lithium, magnesium, sodium, lead, antimony, zinc, tin or strontium.

Examples of such compounds are dialkyl tin mercaptides and dialkyl tin carboxylates.
(3) Organic compounds of any description which prevent degradation of PVC.

Among these are α-phenyl indole or esters of amino crotonic acid.

All these compounds may be used alone or as mixtures with each other either as solids or as solutions in any suitable solvent not necessarily being a stabiliser. Combinations which may be used are of calcium and zinc carboxylates or of a barium phenate with the cadmium salt of a branched chain fatty acid or of barium, cadmium and zinc carboxylates.

There may be used with the foregoing stabilisers, materials which enhance the effectiveness of the stabilisers but which are not stabilisers for PVC when used alone. These are referred to as co-stabilisers and include (a) Epoxidised oils and esters such as epoxidised soya bean oil or epoxidised octyl oleate.

(b) Esters of phosphorous acid which may be trialkyl, triaryl or alkyl-aryl. For example triphenyl phosphite, tris (nonyl phenyl) phosphite or diphenyl isodecylphosphite.

(c) Aliphatic hydrophilic compounds such as pentaerythritol, neopentyl glycol, sorbitol or partial esters of glycerol.

(d) Phenolic compounds such as 2:6-di-tert-butyl-4-methyl phenol, or 2:2 bis (4'-hydroxy phenyl) propane.

These co-stabilisers can be used singly or together with the main stabiliser in any proportions and combinations. They may be applied in their natural state, alone or in mixtures of stabilisers, or in solvent solutions, alone or in admixture with the stabilisers, using suitable solvents which are not necessarily PVC stabilisers.

They may also be used in admixture with lubricants such as polyethylene waxes, ester waxes, stearic acid, calcium stearate, lead stearate, fillers such as calcium carbonate ground or precipitated or china clays.

They may also be used with materials which absorb ultra-violet light, making the PVC compound more stable to light exposure, for example benzophenones or benzotriazoles.

They may also be used in admixture with other known plasticisers which may be:

(a) Flame retardant such as triarylphosphates, alkyl diaryl phosphates.

(b) Phthalate esters.

(c) Low temperature plasticisers such as adipate, sebacate, and azelate esters.

(d) Conventional polyester plasticisers such as poly (1:3 butylene glycol adipate) end-stopped with a $C_8$ alcohol or other typical members of this class.

(e) Aryl esters of alkane sulphonic acids.

(f) Extenders comprising halogenated paraffins or aromatic hydrocarbons.

The following Examples further illustrate the present invention.

The acid value is determined by dissolving a sample of the polyester in neutralised ethanol (or an ethanol-toluene mixture) and titrating with N/10 sodium hydroxide solution using phenolphthalein as indicator. The result is expressed in mg KOH per g.

The hydroxyl value is measured by acetylating the polyester with excess acetic anhydride in ethyl acetate with p-toluene sulphonic acid as catalyst followed by hydrolysis of unreacted acetic anhydride. This reaction mixture, and an aliquot of the acetylation reagent are titrated with standard alkali. The difference in the titres gives a measure of the acetic anhydride which has reacted with the hydroxyl groups and from this figure the hydroxyl value (in mg KOH per g) can be calculated.

The viscosity is measured using an Ubbelohde suspended level viscometer (ASTM D445-IP71).

EXAMPLES 1 to 4

A 2 liter four necked round bottom flask was fitted with a stirrer in a ground glass stirrer gland, a 0–250° C. contact thermometer in a thermometer pocket, and a nitrogen inlet. The flask was also fitted with a vacuum jacketed Vigreux column (6 inch effective length), surmounted by a water separator provided with a water-cooled condenser. The amounts of the reactants specified in Table I were charged to the flask together with 10–15% by weight on the theoretical yield of polyester of xylene and 0.1% by weight based on the theoretical yield of polyester of dibutyl tin oxide. Activated carbon in an amount 1% by weight based on the theoretical yield of ester was added to the reaction mixture in order to preserve the colour of the product.

The reactants were then heated up to approximately 200° C. over 8 hours with stirring, and this temperature maintained for a further 10 to 20 hours. A slow stream of nitrogen was passed into the reaction flask throughout the reaction. Water formed in the reaction was separated from the xylene in the water separator. When the acid value of the reaction mixture had reached the value given in Table I, the solvent was removed by heating the reaction mass under reduced pressure. The mixture was finally vacuum stripped at 200° C. for one hour at 20 millimeters mercury pressure. The product was filtered in a pressure filter under nitrogen and was obtained as a clear liquid. The yields and properties of these polyesters are given in Table 1. The "mixed dicarboxylic acids" referred to in Tables 1 and 2 is a commercially available product with the approximate composition succinic acid: 27.4%
glutaric acid: 42.4%
adipic acid:  30.2%

Comparative Examples A to F

These polyesters were prepared in a similar manner to that described for Examples 1 to 4 but using the reactants in the amounts specified in Table I. The yields and properties of these polyesters are given in Table I.

Comparative Examples G and H

These polyesters were prepared in a similar manner to that described for Examples 1 to 4 (except that in Example H tetra-butyl titanate was used as catalyst) but using the reactants in the amounts specified in Table 2. The yields and properties are given in Table 2.

Comparative Examples I and J

These polyesters were prepared in a similar manner to that described in Example 28 and 32 respectively of British Patent Specification 859,642. The polyester of Example J was prepared by acetylating 400 grams of the polyester of Example I with four times the theoretical amount of acetic anhydride at 100° C. for a period of four to five hours. Excess acetic acid and acetic anhydride were then removed under vacuum. The yields and properties are given in Table 2.

TABLE 1

| | REACTANTS (g) [mole % based on polyester] | | | | | | | | |
|---|---|---|---|---|---|---|---|---|---|
| Ex. | Mixed di-carboxylic acids | Ethylene glycol | Monofunctional reactant = isooctyl alcohol except were other wise indicated | ε-caprolactone | Yield (g) | Acid value (mg KOH/g) | Hydroxyl value (mg KOH/g) | Viscosity (cs at 25° C). | Mol. Wt. (vapour pressure osometer) |
| 1 | 272 | 65.5 | 303 | 622 | 1129 | 2.3 | 9.0 | 351 | 800 |

TABLE 1-continued

| | REACTANTS (g) [mole % based on polyester] | | | | | | | | |
|---|---|---|---|---|---|---|---|---|---|
| Ex. | Mixed dicarboxylic acids | Ethylene glycol | Monofunctional reactant = isooctyl alcohol except were otherwise indicated | ε-caprolactone | Yield (g) | Acid value (mg KOH/g) | Hydroxyl value (mg KOH/g) | Viscosity (cs at 25° C). | Mol. Wt. (vapour pressure osometer) |
| 2 | [18.4] 272 | [9.77] 88.0 | [21.5] 185 | [50.3] 534 | 933 | 2.2 | 2.0 | 1,010 | 1,051 |
| 3 | [21.0] 272 | [14.9] 94.2 | [14.9] 185 | [49.2] 236 | 654 | 1.0 | 16.5 | 444 | 820 |
| A | [28.5] 274 | [21.7] 111 | [20.3] 83.2 | [29.5] 217 | 530 | 9.5 | 2.0 | 2,500 | 1,325 |
| B | [31.6] 272 | [28.3] 123 | [10.1] 70.7 | [30.0] 221 | 533 | 1.4 | 12 | 3,981 | 1,300 |
| C | [31.0] 274 | [30.6] 122 | [8.42] 35.7 | [30.0] 205 | 485 | 5.3 | 1.5 | 16,590 | 2,250 |
| D | [32.5] 272 | [33.8] 135 | [4.39] 18.2 | [29.3] 211 | 534 | 2.0 | 5.2 | very | 2,150 |
| 4 | [32.4] 137 | [35.3] 125 | [2.27] isooctanoic acid. 219 | [30.0] 218 | 555 | 0.94 | <1.0 | 331.3 | 785 |
| E | [15.6] 274 | [31.3] 175 | [23.4] isooctanoic acid. 105 | [29.8] 271 | 651 | 1.3 | 8.5 | 352.8 | 1,375 |
| F | [25.31] 274 | [35.6] 159 | [9.04] isooctanoic acid. 38.8 [3.86] | [30.1] 235 [29.9] | 539 | 4.1 | <1.0 | 31,760 | 2,200 |
| | [29.0] | [37.2] | | | | | | | |

TABLE 2

| | REACTANTS (g) [mol % based on polyester] | | | | Yield (g) | Acid value (mg KOH/g) | Hydroxyl value (mg KOH/g) | Viscosity (cs at 25° C) | Mol.Wt. (vapour pressure osmometer) |
|---|---|---|---|---|---|---|---|---|---|
| Ex. | Dicarboxylic acid | Diol | Alcohol or monocarboxylic acid | ε-Caprolactone | | | | | |
| G | sebacic 412 [30.4] | 1,6-hexanediol 278 [35.6] | 2-ethylhexanoic acid 38.3 [4.04] | 225 [29.9] | 817 | 0.53 | 25 | SOLID m.p. 42° C | 2250 |
| H | sebacic 412 [33.1] | 1,6-hexanediol 234 [32.6] | 7-ethyl-2-methyl-undecanol-4 58.8 [4.55] | 205 [29.8] | 822 | negl. | 9.0 | SOLID m.p. 46-9° C | 2410 |
| I | adipic 365 [31.7] | ethylene glycol 179 [36.5] | — | 285 [31.7] | 729 | 0.65 | 38 | 14,260 | 2898 (calculated) |
| J | 400 g polyester of Example I acylated with 116 g acetic anhydride (=4 × theoretical amount) | | | — | 378 | 1.5 | 2.7 | 52,920 | 1750 |
| K | di-ethyl-oxalate 292 [33.1] | ethylene glycol 122 [32.6] | n-hexanol 28.0 [4.55] | 205 [29.8] | 396 | 201 | 16 | >80,000 | — |

Comparative Example K

The reactants specified in Table 2 together with 0.5 grams dibutyl tin oxide were charged to a 1 liter flask fitted for distillation incorporating a 15 cm vacuum jacketed Vigreux column. The mixture was heated for 9 hours at 115° to 200° C., 190 grams of ethanol being collected as distillate. After heating further during 1¼ hours up to 163° C. at 21 millimeters mercury pressure, there was evidence of some decomposition (gas evolution). The product was cooled to room temperature and the yield and properties are given in Table 2.

EXAMPLES 5 TO 8

The compositions of Examples 5 to 8 were obtained by incorporating 35 parts of the polyesters of Examples 1 to 4 respectively into 65 parts of polyvinyl chloride (Breon S 125/12), 4 parts of white lead paste and 1 part calcium stearate. The premix was compounded on a two roll mill at 165° C. for 15 minutes, and compression moulded at 180° C. for 6 minutes. The physical properties are given in Tables 3 and 4.

Comparative Examples L to V

The compositions of comparative Examples L to V were obtained by incorporating 35 parts of the polyesters of Comparative Examples A to K respectively into 65 parts of polyvinyl chloride (Breon S 125/12), 4 parts of white lead paste and 1 part calcium stearate. The premix was compounded on a two roll mill at 165° C. for 15 minutes, and compression moulded at 180° C. for 6 minutes. The physical properties are given in Tables 3 and 4.

TABLE 3

| Ex. | $\frac{\text{(No. Mols. Alcohol)}}{\text{(No. Mols. Diol)}} \times 100$ | Mol. wt. (vapour pressure osmometer) | Amount of Caprolactone (mol %) | IRHD(54 parts of plasticiser per 100 parts of resin) | Clear-Point (° C.) | Cold flex temperature (° C.) |
|---|---|---|---|---|---|---|
| 5 | 220 | 800 | 50 | 77 | 125 | −17 |
| 6 | 100 | 1,051 | 50 | 78 | 136 | −14 |
| 7 | 93.5 | 820 | 30 | 79 | 136 | −16 |
| L | 35.7 | 1,375 | 30 | 91 | 159 | −5.0 |

TABLE 3-continued

| Ex. | $\frac{\text{(No. Mols. Alcohol)}}{\text{(No. Mols. Diol)}} \times 100$ | Mol. wt. (vapour pressure osmometer) | Amount of Caprolactone (mol %) | IRHD(54 parts of plasticiser per 100 parts of resin) | Clear-Point (° C.) | Cold flex temperature (° C.) |
|---|---|---|---|---|---|---|
| M | 27.5 | 1,300 | 30 | 87 | 155 | −9.0 |
| N | 13.0 | 2,350 | 30 | 95 | 177 | −1.0 |
| O | 6.43 | 2,150 | 30 | 93 | 185 | — |
| 8 | 150* | 785 | 30 | 80 | 139 | −15 |
| P | 35.7* | 1,375 | 30 | 86 | 165 | −6.0 |
| Q | 13.3* | 2,200 | 30 | 94 | 183 | −2.0 |

*These are polyesters terminated with a monocarboxylic acid, and this ratio is
$\frac{\text{(No. Mols. monocarboxylic acid)}}{\text{(No. Mols dicarboxylic acid)}} \times 100$

TABLE 4

| Example | Mol. Wt. (vapour pressure osmometer) | Viscosity (cs at 25° C) | IRHD(54 parts of plasticiser per 100 parts of resin) | Clear-Point (° C) | Cold Flex Temperature (° C) |
|---|---|---|---|---|---|
| 7 | 820 | 444 | 79 | 136 | −16 |
| R | 2250 | (SOLID (m.p. 42° C) | 80 | 138 | −9.0 |
| S | 2410 | (SOLID (m.p. 46–9° C) | 81 | 148 | −11.0 |
| T | 2898 | 14,260 | 91 | 177 | −6.0 |
| U | 1750 | 52,920 | 90 | 173 | 0 |
| V | — | >80,000 | - NOT COMPATIBLE WITH PVC - | | |

The physical properties of the compositions of Examples 5 to 8 and Comparative Examples L to V were determined by the following methods:
(a) International Rubber Hardness Degrees (IRHD) tested to BS 903 part A7 at 23° C.
(b) Cold Flex Temperature (Clash & Berg) was determined according to BS 2782 method 104B.
(c) Clear Point — the temperature at which a few particles of PVC heated in an excess of plasticiser and observed at a magnification of X 100 with a microscope are no longer discernible. The test indicates the relative processability of formulations containing differing plasticisers. In general the lower the clear point the easier the processing of the formulation.

Table 3 shows that the products of the present invention are more efficient (lower IRHD figure), have lower clear points and give lower cold flex temperatures when incorporated into PVC than comparable products falling within Brit. Pat. No. 1,137,882.

Table 4 illustrates the properties of a typical product of the present invention compared with products falling within Brit. Pat. No. 859,642. The product of the present invention is a liquid of moderate viscosity which is therefore easily handled and readily incorporated into a PVC composition. It is superior with regard to efficiency, clear point and cold flex temperature when compared with the products used in Examples R to V which are either solid or of high viscosity. Moreover, the product of Example K used in Example V underwent some decomposition during its preparation and was not compatible with PVC.

EXAMPLES 9 to 16

By following a similar procedure to that described for Examples 1 to 4 but using the reactants specified in Table V, compounds of formula I are produced.

TABLE V

| Example No. | Residue of 6-hydroxy caproic acid | Monocarboxylic acid corresponding to residue M | Monohydric alcohol corresponding to residue M | Diol corresponding to residue P | Aliphatic dicarboxylic acid corresponding to residue D | Aromatic dicarboxylic acid corresponding to residue D |
|---|---|---|---|---|---|---|
| 9 | ε-caprolactone | — | n-butanol | butane-1,3-diol | mixed dicarboxylic acids* | isophthalic |
| 10 | ε-caprolactone | — | nonanol | propane-1,2-diol | glutaric | phthalic anhydride |
| 11 | ε-caprolactone | — | 2-ethyl-hexanol | butane-1,3-diol | adipic | phthalic anhydride |
| 12 | ε-caprolactone | — | "Linevol" 911 | di-ethylene glycol | adipic | isophthalic |
| 13 | ε-caprolactone | caproic | — | ethylene glycol | glutaric | phthalic-anhydride |
| 14 | ε-caprolactone | caprylic | — | butane-1,3-diol | adipic | isophthalic |
| 15 | ε-caprolactone | 2-ethyl-hexoic | — | propane-1,2-diol | mixed dicarboxylic acids* | phthalic anhydride |
| 16 | ε-caprolactone | capric | — | butane-1,3-diol | glutaric | isophthalic |

*As defined in Examples 1 to 4

What we claim is:
1. A compound having the formula

$$M(P)_a(D)_b(L)_cM \qquad I$$

in which M is the residue of one or more aliphatic monocarboxylic acids containing from 4 to 12 carbon atoms or one or more saturated straight or branched chain monohydric alcohols containing from 4 to 12 carbon atoms, P is the residue of one or more saturated straight or branched chain aliphatic diols containing from 2 to 4 carbon atoms, D is the residue of one or more aliphatic dicarboxylic acids containing from 4 to 6 carbon atoms, or the residue of one or more such acids with a proportion not exceeding 10 mole % of the total acids used, of one or more aromatic dicarboxylic acids or anhydrides selected from the group consisting of o-phthalic acid, phthalic anhydride and isophthalic acid, L is the residue of 6-hydroxycaproic acid, each of the residues being joined together by ester linkages, residues P, D and L being distributed at random throughout the molecule, a, b and c each having a value greater than zero, the amount of residue of hydroxy acid being from 10 mole % to 90 mole %, based on the total number of moles of reactants, and the molar ratios of the remaining reactants being chosen so that the average molecular weight of the product is from 500 to 1400, which is prepared by reacting in one-step a mixture of the following components (a) from 10 to 90 mole % of epsilon caprolactone or the corresponding hydroxyacid, (b) a hydroxylic component which comprises one or more saturated straight or branched chain aliphatic diols containing from 2 to 4 carbon atoms, (c) an acidic component which comprises one or more aliphatic dicarboxylic acids containing from 4 to 6 carbon atoms or one or more such acids with a proportion not exceeding 10 mole % of the total acids of one or more aromatic dicarboxylic acids or anhydrides selected from the group consisting of o-phthalic acid, phthalic anhydride and isophthalic acid, and (d) one or more aliphatic monocarboxylic acids containing from 4 to 12 carbon atoms or one or more saturated straight or branched chain monohydric alcohols containing from 4 to 12 carbon atoms such that the ratio of monofunctional component to difunctional component is from 93.5 mol % to 220 mol % and such that the hydroxylic components are used in stoichiometric amounts or up to 20% excess over the stoichiometric amounts related to the acidic components.

2. A polyester as claimed in claim 1 in which the residue of 6-hydroxy-caproic acid is derived from epsilon caprolactone.

3. A polyester as claimed in claim 1 in which M is the residue of a monocarboxylic acid containing from 8 to 10 carbon atoms.

4. A polyester as claimed in claim 3 in which M is the residue of isooctanoic acid.

5. A polyester as claimed in claim 1 in which M is the residue of a monohydric alcohol containing from 8 to 11 carbon atoms.

6. A polyester as claimed in claim 5 in which M is the residue of isooctyl alcohol.

7. A polyester as claimed in claim 1 in which the diol corresponding to residue P is ethylene glycol.

8. A polyester as claimed in claim 1 in which the aliphatic dicarboxylic acid or anhydride corresponding to residue D is succinic, glutaric or adipic acid or anhydride.

9. A polyester as claimed in claim 1 in which the aromatic dicarboxylic acid or anhydride corresponding to residue D is o-phthalic acid or phthalic anhydride.

10. A composition comprising (a) a thermoplastic polymer selected from the group consisting of poly(vinyl chloride) and poly(vinyl chloride) copolymers and (b) a plasticizing amount up to 60% by weight of the plasticized composition of a compound according to claim 1.